United States Patent [19]

McFarlin

[11] Patent Number: 5,120,439
[45] Date of Patent: Jun. 9, 1992

[54] COFFEE FILTER TAB
[76] Inventor: Bill McFarlin, Rte. 4, Box 71, Williston, N. Dak. 58801-9222
[21] Appl. No.: 682,941
[22] Filed: Apr. 10, 1991
[51] Int. Cl.⁵ .............................................. B01D 27/06
[52] U.S. Cl. .................................. 210/482; 210/493.1; 210/493.5
[58] Field of Search ............ 210/232, 481, 482, 493.1, 210/493.5

[56] References Cited

U.S. PATENT DOCUMENTS

| | | | |
|---|---|---|---|
| 4,362,623 | 12/1982 | Holopainen | 210/493.5 |
| 4,586,630 | 5/1986 | Loder | 221/46 |
| 4,592,840 | 6/1986 | Brooks | 210/493.5 |
| 4,595,502 | 6/1986 | Himmelsbach | 210/486 |
| 4,696,744 | 9/1987 | Sedlacek | 210/493.5 |

Primary Examiner—Robert A. Dawson
Assistant Examiner—Wanda L. Millard
Attorney, Agent, or Firm—Levy, Zito & Grandinetti

[57] ABSTRACT

A coffee filter is provided that has tabs for easy removal of filter. There is defined in one side of the filter channels where the tabs are provided. The tabs are arranged and located in the upper portion of the filters, and wherein after the tabs are formed, slotted portions are provided in the filters. Extended tabs may also be used in one form of the filters.

3 Claims, 2 Drawing Sheets

COFFEE FILTER TAB

BACKGROUND OF THE INVENTION

The present invention relates to coffee filters, and more particularly to coffee filters that have bent-over tabs which facilitate the handling and removal of the filters, and wherein channels are arranged in the filters where the tabs are provided. Each tab is arranged directly in line with the tab in front. In certain instances an extended tab can be used.

DESCRIPTION OF THE PRIOR ART

Various types of coffee filters have been provided, as for example as shown in prior Ehrlich U.S. Pat. No. 3,616,934; Hicks et. al. U.S. Pat. No. 3,780,871; Kitagawa U.S. Pat. No. 4,715,271; and Sandvig U.S. Pat. No. 4,728,425. However, neither these prior patents nor any others known to Applicant achieve the results accomplished by the present invention.

SUMMARY OF THE PRESENT INVENTION

A primary object of the present invention is to provide coffee filters that have bent-over tabs for easy removal of the filters, and wherein there is provided channels on one side of the filters where the bent-over tabs are arranged.

Another object of the present invention is to provide coffee filter tabs wherein the filters are made of a suitable material such as paper and include a central circular portion as well as a pleated side portion that has an accordion-like construction, and wherein the pleated accordion-like portion is provided with bent-over tabs that can be readily grasped between the fingers so that by gripping the tabs the removal or handling of the filters is greatly facilitated.

A still further object of the present invention is to provide coffee filter tabs which can be used to expedite the handling and removal of coffee filters, as for example when such filters are used for making coffee from ground coffee.

A still further object of the present invention is to provide coffee filter tabs that can be used with various types of coffee makers, and wherein there is provided tabs which permit easier separation of the filters from a stack of coffee filters, and wherein the tabs also facilitate the removal of the filters from the coffee makers after the filters have been used.

These and other objects and advantages of the present invention will become apparent with reference to the drawings, the description of the preferred embodiment and the appended claims.

DESCRIPTION OF THE PREFERRED EMBODIMENT

Figure 1:
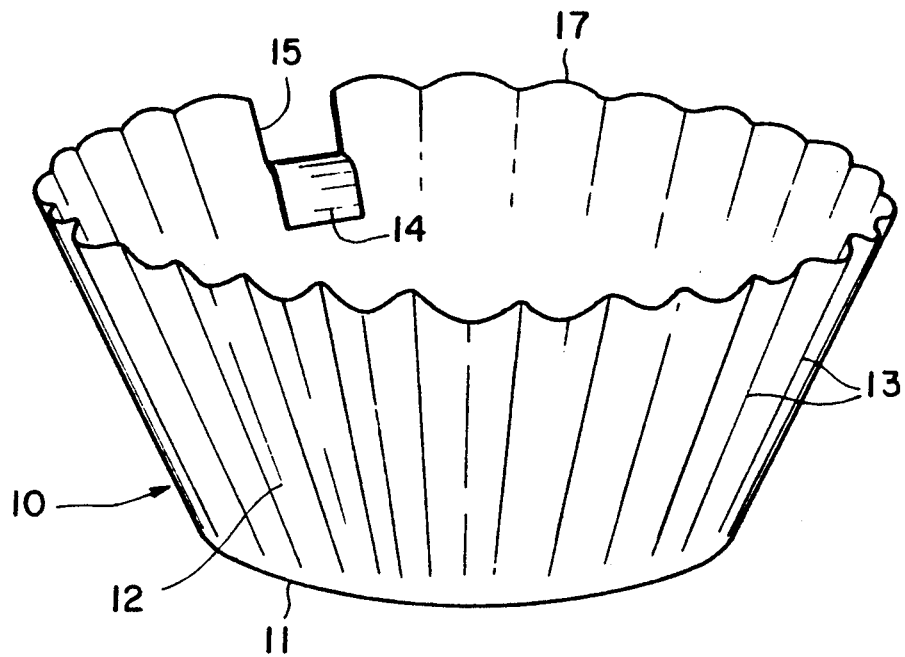
FIG. 1 is a perspective view illustrating a coffee filter with the tab formed thereon.

Referring in detail to the drawings, the numeral 10 indicates coffee filters that include a central generally circular position 11 as well as a pleated side portion 12 that has an accordion-like construction. The numeral 13 indicates pleats in the side portion 12 of coffee filters 10.

In accordance with the present invention, there is provided tabs 14 that are formed in the upper edge portion adjacent the upper edge 17 of the coffee filters 10. The tabs 14 are bent-over so as to provide cutouts or slotted areas 15, FIG. 1. In FIG. 2 the numeral 16 indicates fingers of the user gripping or grasping the tab 14 so as to facilitate the removal or handling of the coffee filters.

Figure 2:
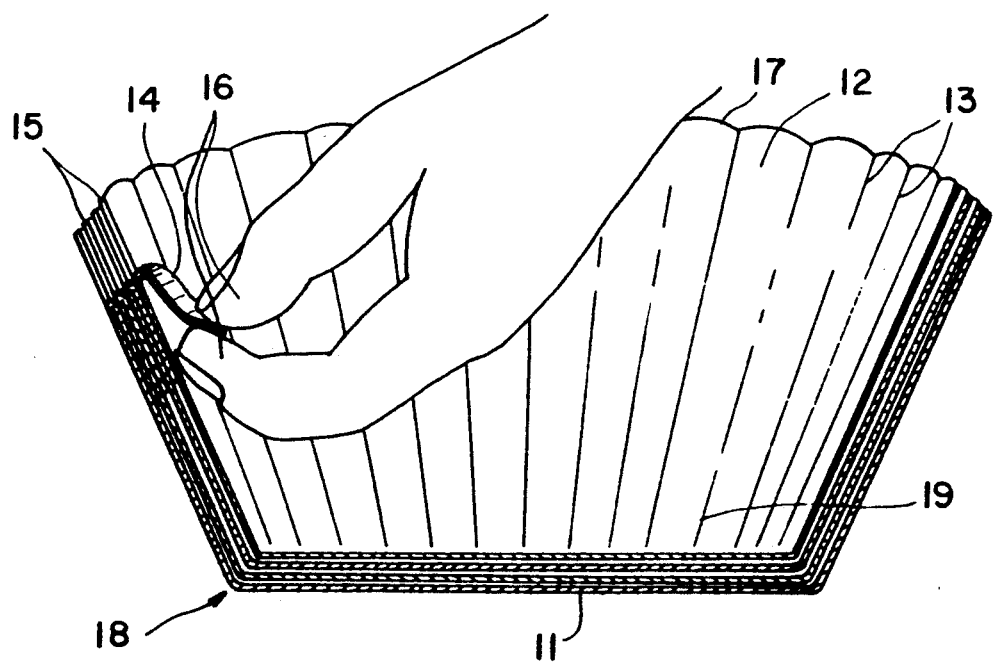
FIG. 2 is an elevational view illustrating a stack of filters and showing the tab being gripped by the fingers.

FIG. 1 illustrates a single coffee filter 10, while in FIG. 2 the numeral 18 illustrates a stack of coffee filters 18 which are each provided with the bent-over tabs 18.

Figure 3:
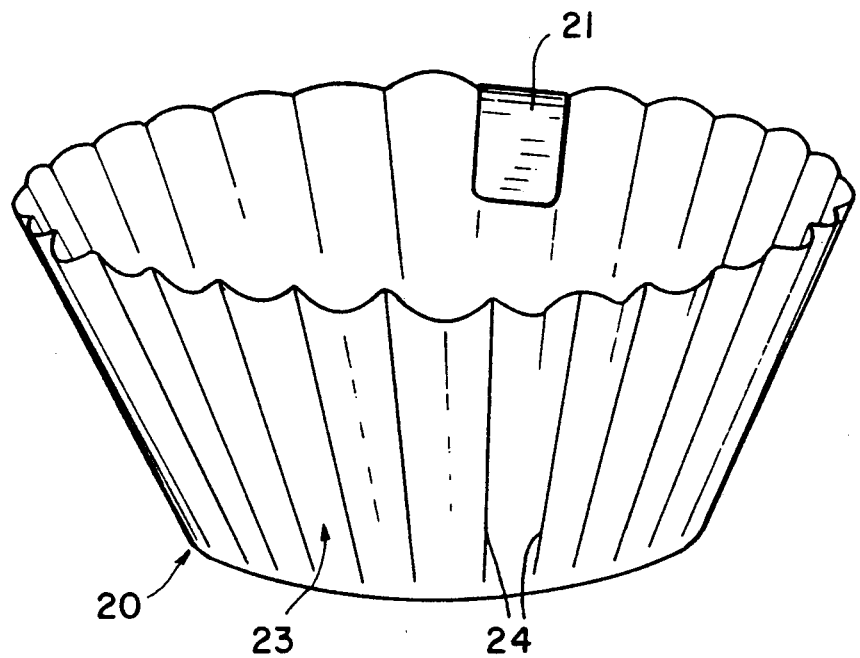
FIG. 3 is a perspective view of a modified form of the invention.

Attention is directed to FIG. 3 of the drawings wherein there is illustrated a modified construction that includes a filter 20 that has a tab 21. In FIG. 3 the tab 21 is illustrated in its initially folded portion as when the filters are arranged in a stack before they are used in a coffee maker. The filter 20 includes a frusto-cone shaped side portion 23 that has a frusto-cone shape that is provided with pleats 24 so that the side portion 23 has an accordion-like construction.

Figure 4:
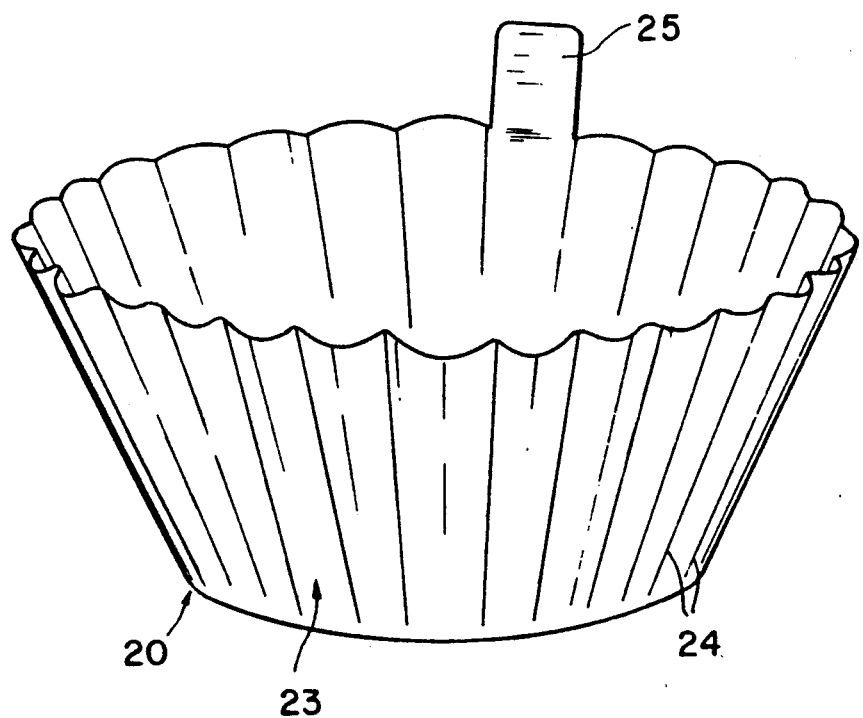
FIG. 4 is a perspective view corresponding to FIG. 3 but showing the tab in extended position.

Referring to FIG. 4 of the drawings, the numeral 25 illustrates the tab 25 in its extended position as compared to the arrangement shown in FIG. 3 wherein the tab 21 is in its downwardly folded position prior to use.

In FIG. 1, there is illustrated a frusto-cone shape filter that has a cutout where the tab is provided. FIG. 2 is a cross-sectional view illustrating a pack or stack of filters.

In FIG. 3 the flipper or grabber or tab 21 is provided on each filter 20 and the element 21 provides a convenient means for grabbing or handling the coffee filter, and FIG. 3 illustrates the position of the parts when the filters are initially arranged in a stack. FIG. 4 corresponds to FIG. 3 but shows the tab in an outward or extended position so that the tab 25 can be conveniently gripped in order to facilitate the handling of the filter.

From the foregoing, it will be seen that there has been provided tabs for coffee filters. In use, with the parts arranged as shown in the drawings, the plurality of coffee filters 10 are each provided with tabs 14 that are bent-over, and the tabs 14 provide a convenient method and means for gripping the filters so that, for example as shown in FIG. 2, the fingers 16 can readily engage and grip a tab 14 so as to permit an individual coffee filter 10 to be removed from the stack of filters 18 whereby the individual coffee filter can be positioned in the coffee maker. Thus, due to the provision of the tabs 14, the coffee filters can be more easily removed from the coffee maker after the coffee has been brewed. It will be noted that the tabs 14 are arranged in the upper areas of the side portions 12 of the coffee filters so that when the tabs 14 are formed, there is provided channels or slots 15. Because these slotted areas 15 are arranged in the upper edge portion of the coffee filters, the coffee grounds or liquid in the filter will not have a tendency to spill out through the slotted areas 14 inasmuch as the tabs 14 are along the upper edge 17 of the coffee filter.

The parts can be made of any suitable material and in different shapes or sizes as desired or required.

It will be understood that the individual filters 10 can be placed in a basket or suitable part of any type of coffee maker, and then the suitable quantity of coffee grounds are placed in portion 19 of the individual filter 10. As is customary, hot water is poured through the coffee grounds and filter so as to provide the coffee.

After the coffee has been made, due to the provision of the tab 14, it is easy for the user to manually grip the tab 14 with the fingers 16 so that the used coffee filter can be removed from the coffee maker and discarded. Similarly, with the plurality of coffee filters 10 arranged in a stack 18, due to the provision of the bent or folded-over tab 14, an individual filter 10 can be readily and easily removed from the stack 18 and positioned in the coffee maker so that the tab 14 generally facilitates the handling of the coffee filter.

The filters are adapted to be made of any suitable material such as paper. Without the tabs, the handling and removal of filters is not as easily accomplished. While the present invention has been described for use on coffee filters, it is to be understood that the present invention is not limited to the making of coffee since the principles of the present invention are applicable to the products such as tea or the like.

In FIG. 2 each tab is directly in line with the tab in front. As shown in FIGS. 2 and 4, an extended tab can be used instead of the tab construction shown in FIGS. 1 and 2.

It will therefore be understood that while I have shown and described the invention in a preferred form, changes may be made in the structure shown, without departing from the scope of the invention, as sought to be defined in the following claims.

I claim:

1. A coffee filter comprising a member having a circular central portion, and an upstanding side portion, the side portion being pleated and having an accordion-like construction, a tab formed in the filter, said tab adapted to be conveniently manually gripped to facilitate handling of the filter, the tab being arranged in the upper edge of the side portion of the filter, and wherein a slotted channel is defined in the upper edge of the side portion substantially parallel and immediately adjacent the tab; the slotted portion being in a raised elevation and location so that coffee grounds, and water will not be likely to spill through the raised slotted portion, the filter being made of paper, and wherein the filters are adapted to be arranged in a stack with the tabs in alignment with each other so that the tabs and slotted channels coincide with each other in order to permit the fingers of the user to readily grip the bent-over tab for separating a filter from a stack of filters, and wherein the tabs also facilitate the removal of the filters from the coffee makers after the coffee has been made.

2. A method of manufacturing coffee filters comprising the steps of making a plurality of coffee filters out of paper stock, providing the filters with a central circular portion and also providing the filters with a pleated accordion-like side portion, and providing each of the filters with a bent-over, folded tab that defines a slotted channel in the upper edge portion of the side of the filter, whereby the tabs can be manually gripped in order to facilitate handling of the filters, the slotted channel making it very easy for people with poor vision to locate the tab and the slotted channel also helping people with arthritis and the like to handle the tabs individually.

3. An article of manufacture comprising a coffee filter consisting solely of a member having a central circular portion and an upstanding side portion, the side portion being pleated and having an accordion-like construction, a tab formed in the filter, said tab adapted to be conveniently manually gripped to facilitate handling of the filter, the tab being arranged in the upper edge of the side portion of the filters, and wherein a slotted channel is defined in the upper edge of the portion substantially parallel and adjacent the tab, the slotted portion being in a raised location so that coffee grounds and water will not be likely to spill out through the raised slotted portion, the filter being made of paper, and wherein the filters are adapted to be arranged in a stack wherein the tabs are in alignment with each other so that the tabs and slotted channels coincide with each other to permit the fingers of the user to readily grip the bent-over tabs for separating a filter from a stack of filters, and wherein the tabs also facilitate the removal of the filters from the coffee makers after the coffee has been made in coffee makers, the slotted channel making it very easy for people with poor vision to locate the tab and the slotted channel also helping people with arthritis and the like to handle the tabs individually.

* * * * *